Patented Dec. 30, 1952

2,623,901

UNITED STATES PATENT OFFICE 2,623,901

PRODUCTION OF CHOLINE CHLORIDE

Howard C. Klein, Brooklyn, N. Y., and Roland Kapp, Newark, N. J., assignors to Nopco Chemical Company, Harrison, N. J., a corporation of New Jersey No Drawing. Application January 28, 1950, Serial No. 141,152

7 Claims. (Cl. 260—567.6)

This invention relates to the production of choline chloride and more particularly to new and improved means for producing choline chloride.

Choline (beta-hydroxyethyl trimethylammonium hydroxide) is a member of the vitamin B group and is generally considered to be necessary for normal nutrition. Synthetic choline is usually employed in the form of choline chloride. There is a considerable demand for this compound, particularly for use in the vitamin fortification of animal and poultry feeds.

It is the object of this invention to provide improved means for producing choline chloride.

A further object of the invention is to provide means for producing choline chloride from readily available raw materials.

Another object of the invention is to provide means for producing choline chloride in very high yields.

An additional object of the invention is to provide a process for producing choline chloride which may be carried out in a very simple manner with a minimum amount of equipment.

Another object of the invention is to provide a process for producing choline chloride which may be carried out in a very short time.

Other objects of the invention will in part be obvious and will in part appear hereinafter.

The above and other objects of the invention are accomplished by admixing an aqueous solution of trimethylamine with ethylene chlorhydrin at room temperature or at a temperature above room temperature. It is ordinarily not necessary, however, to heat the reaction mixture to a temperature above room temperature since the reaction is exothermic and will proceed to completion without such heating. In some cases when very large quantities of the reactants are admixed with each other it may even be desirable to cool the reaction mixture to some extent in order to prevent the reaction temperature from rising above 100° C. Temperatures of around 100° C. have been found to have no detrimental effect and no cooling need be supplied unless desired as long as the volume of the reaction mixture is of such a size that the heat will be dissipated sufficiently without additional cooling to keep the temperature from rising above 100° C. When only small quantities of the reactants are admixed with one another, the maximum temperature which will occur in the reaction mixture will be lower of course than with large volumes of the reactants inasmuch as the heat which is produced is more readily dissipated by the smaller volumes of the reaction mixtures due to the greater proportionate amount of surface area per unit volume of the mixtures. Thus in small laboratory-size reaction mixtures, the reaction temperature ordinarily will not rise above about 35° to 40° C. The temperature of the reaction mixture is then allowed to fall to room temperature and the reaction mixture then preferably allowed to stand for about eighteen hours to insure completion of the reaction. If the temperature of the reaction mixture did not rise to at least about 55° to 65° C. either because of the small size of the reaction mixture or because of the application of external cooling to the reaction mixture, it is preferred that the reaction mixture be heated to about such a temperature for at least about an hour in order to insure the maximum yield of the desired product.

If one desires to carry out the reaction between the trimethylamine and the ethylene chlorhydrin in a rather short time or as a continuous process, the ethylene chlorhydrin and the aqueous solution of the trimethylamine may be pumped through a proportionator after one of the reactants, preferably the trimethylamine, has been heated under pressure to a temperature of about 90° to 100° C. The proportionator is preferably heated to a temperature of about 90° to 100° C. by means of steam or some other suitable heating medium surrounding the proportionator. By employing such a method of reacting the ethylene chlorhydrin with the trimethylamine, only a short time will be required to convert the reactants into choline chloride.

The choline chloride will be obtained in each case, both in the batch process and in the continuous process using a proportionator, as an aqueous solution thereof ordinarily having a concentration of choline chloride of about 40% to 45%. The pure choline chloride may be recovered from this aqueous solution by distilling off the water in the solution, preferably under reduced pressure. The choline chloride which is recovered will have a purity of 98% or better and may be converted to the U. S. P. grade of choline chloride merely by one recrystallization from a solvent such as isopropanol, isobutanol, etc. For many commercial uses, particularly for the fortification of stock and poultry feeds, it is unnecessary to recover the choline chloride from the aqueous solutions obtained by the process of the invention and instead one may merely remove about half of the water in the solutions, thus giving about a 70% aqueous solution of the choline chloride. These concentrated aqueous solutions as such are suitable for direct use in the fortification of stock and poultry feeds.

Since trimethylamine has a boiling point of 3.8° C., it was quite unexpected that by merely admixing essentially stoichiometric volumes of aqueous solutions of trimethylamine with ethylene chlorhydrin and allowing the temperature of the reaction mixture to rise to whatever temperature was developed by the heat of reaction, one could obtain excellent yields of choline chloride. However, we have found that such result does occur and that little or no trimethylamine will be lost from the reaction mixture due to the rather high temperatures which develop therein if no external cooling is applied to the reaction mixture.

In carrying out the reaction between the ethylene chlorhydrin and the trimethylamine, the aqueous solutions of the trimethylamine may be of any desired concentration. Since trimethylamine is available commercially in the form of 25% to 30% aqueous solutions thereof, we prefer to employ such solutions in our process. If desired, more dilute solutions can be employed in the process but ordinarily there is no substantial advantage in so doing and in fact the time required for the reaction will be extended proportionately when the more dilute solutions of trimethylamine are used.

The ethylene chlorhydrin which is utilized in our process may be the ethylene chlorhydrin obtainable commercially and need not be purified before being employed in the reaction with the trimethylamine.

In carrying out the process of our invention as a batch process, the ethylene chlorhydrin and the aqueous trimethylamine solution are admixed with each other in the desired proportions. In most cases we prefer to employ a slight excess of the trimethylamine; thus in most cases about 1.05 to 1.2 moles of trimethylamine per mole of ethylene chlorhydrin are used. With a small sized batch, it is unnecessary to provide any external cooling to dissipate the heat developed by the reaction. When very large quantities of the reactants are admixed with each other, it is sometimes desirable to apply some external cooling to prevent the temperature of the reaction mixture from rising above 100° C. at which point, of course, the water in the reaction mixture would boil from the mixture. However, we have found that even in carrying out very large sized batch reactions, temperatures of only about 85° to 90° C. are ordinarily developed by the reaction and such temperatures have been found to have no detrimental effects on the reaction mixtures since the yields obtained in such cases have been substantially the same as when external cooling was applied to the reaction mixtures.

In carrying out the process of our invention in a continuous manner by pumping the reactants through a heated proportionating device, the same ratios of reactants as in the batch process are preferably employed. As pointed out above, the reaction proceeds much more rapidly when the process is carried out in this manner, possibly because of the fact that the reactants are at a very high temperature, i. e. about 100° C., when they are first brought into contact with each other and apparently this high temperature forces this reaction to completion immediately. However, if desired, proportionating equipment need not be employed for carrying out the reaction, and instead the reaction may readily be carried out by a batch process by simply admixing the reactants with each other in an open vessel and the reaction then being allowed to proceed to completion of its own accord.

As pointed out above, the aqueous solution of choline chloride which is obtained by the process of the invention is usually concentrated to at least a 70% solution of the material before being employed to fortify animal and poultry feeds with choline chloride. The concentrating of the solutions may readily be carried out by heating the aqueous solutions under reduced pressure. If it is desired to remove all of the water from the solutions so as to obtain choline chloride in a dry powdery form, it is best to add a small amount of an alcohol such as isopropanol to the aqueous solutions after the greater part of the water has already been removed therefrom and then remove the remainder of the water by means of azeotropic distillation with the added alcohol. The dry white crystalline choline chloride thus obtained will have a purity of 98% or greater in substantially all cases. To obtain the U. S. P. grade of choline chloride, the crude material is recrystallized once or twice from a solvent such as isopropanol. In every case, both in the batch process and in the continuous process employing a proportionating device, the yields of the choline chloride will be from about 90% to 100% of the theoretical yields.

For a fuller understanding of the nature and objects of the invention, reference may be had to the following examples which are given merely as further illustrations of the invention and are not to be construed in a limiting sense:

*Example I*

Ethylene chlorhydrin (32.2 grams, 0.4 mole) and 25% aqueous trimethylamine (130 ml., sp. g.=0.924, 0.507 mole) were mixed all at once at room temperature (21° C.). The reaction was exothermic, and the internal temperature of the reaction mixture rose to 35° after 4 hours. The reaction mixture was allowed to stand for an additional 18 hours during which time the temperature of the reaction mixture dropped to room temperature. The mixture was then heated for an additional hour at 55° to 65° C. to drive the reaction to completion. After concentrating the reaction mixture in vacuo on a steam bath to a thick syrup, the last traces of water were removed from the mixture by means of azeotropic distillation using isopropanol. The yield was 55.3 grams (99% of theory) of white, dry crystalline choline chloride having a purity of 98%. Recrystallization of the crude product from isopropanol employing five volumes of isopropanol to 1 gram of the crude product gave U. S. P. grade choline chloride.

*Example II*

Another reaction between ethylene chlorhydrin and trimethylamine was carried out by admixing 42.5 lbs. of ethylene chlorhydrin with 132 lbs. of a 25% aqueous solution of trimethylamine at room temperature. This was a molar ratio of ethylene chlorhydrin to trimethylamine of 1 to 1.06. The reaction, as in Example I, was exothermic and after about 4 hours the temperature had risen to 29° C. At this point, cold water was circulated through a jacket which surrounded the open vessel containing the reactants in order to prevent the temperature of the reaction mixture from rising much above room temperature. Thereafter the reaction mixture was intermittently cooled in such a manner and at no time was the temperature of the reaction mixture allowed to rise above about 36° C. After 24 hours, the temperature of the reaction mixture had fallen to 32° C. and the reaction was considered as being substantially completed. In order to insure the completion of the reaction, however, the reaction mixture was heated for one hour at from 55° to 65° C. The reaction mixture was then concentrated in vacuo to a 70% aqueous solution of the choline chloride. The yield of choline chloride which was obtained was 99.2% of the theoretical yield.

Example III

Another reaction between ethylene chlorhydrin and trimethylamine was carried out employing the same amounts of reactants as in Example II. In the present example, however, no external cooling whatever was applied to the reaction mixture but instead the temperature of the reaction mixture was allowed to proceed to as high a point as the heat of reaction would produce. It was found that the maximum temperature developed was about 65° C. Choline chloride was obtained in essentially the same excellent yields as in the previous examples.

Example IV

When approximately 10 times the quantities of ethylene chlorhydrin and aqueous trimethylamine employed in Examples II and III were utilized, the temperature of the reaction mixture rose to approximately 85° C. when the reaction was carried out in the same manner as in Example III, i. e. without any external cooling of the mixture. As in the previous examples, an excellent yield of choline chloride having a very high degree of purity was obtained.

Example V

In this example ethylene chlorhydrin and aqueous trimethylamine were placed in separate containers of a proportionating device. The trimethylamine was pumped through one side of the proportionator and into a heat exchange unit previously heated to 90° C. by means of a steam jacket. The ethylene chlorhydrin was then pumped through the other side of the proportionator and admixed with the heated trimethylamine. The proportionating device delivered essentially the same ratio of reactants to the reaction zone as was employed in the previous examples. The lengths of pipe which made up the proportionating device were such that the contact time of the reactants in the reaction zone was about two minutes, this time being sufficient for complete reaction. It was found that the aqueous solution which was collected in the receiver was approximately a 45% aqueous solution of choline chloride. On removal of the water from this solution, it was found that choline chloride of a high degree of purity had been produced in essentially the same excellent yields as in the previous examples.

Having described our invention what we claim as new and desire to secure by Letters Patent is:

1. A process for the production of choline chloride comprising reacting aqueous trimethylamine with ethylene chlorhydrin.

2. A process for the production of choline chloride comprising admixing aqueous trimethylamine with ethylene chlorhydrin at about room temperature.

3. A process for the production of choline chloride comprising admixing aqueous trimethylamine with ethylene chlorhydrin at about room temperature and allowing the reaction between the trimethylamine and the ethylene chlorhydrin to proceed without applying external heating to the reaction mixture.

4. A process for the production of choline chloride comprising admixing aqueous trimethylamine with ethylene chlorhydrin at about room temperature and allowing the reaction between the trimethylamine and the ethylene chlorhydrin to proceed without external cooling of the reaction mixture.

5. A process for the production of choline chloride comprising admixing aqueous trimethylamine with ethylene chlorhydrin at about room temperature and allowing the reaction between the trimethylamine and the ethylene chlorhydrin to proceed without applying external heating to the reaction mixture and without applying external cooling to the reaction mixture.

6. A process for the production of choline chloride comprising reacting aqueous trimethylamine with ethylene chlorhydrin at a temperature no lower than about room temperature.

7. A process for the production of choline chloride comprising simultaneously introducing and admixing aqueous trimethylamine with ethylene chlorhydrin in a reaction zone in approximately equal molecular proportions after one of said reactants has been heated to at least about 90° C., and withdrawing the choline chloride produced from the reaction zone.

HOWARD C. KLEIN.
ROLAND KAPP.

REFERENCES CITED

The following references are of record in the file of this patent:

UNITED STATES PATENTS

| Number | Name | Date |
|---|---|---|
| 2,087,506 | De Groote | July 20, 1937 |
| 2,129,264 | Downing et al. | Sept. 6, 1938 |
| 2,135,521 | Major et al. | Nov. 8, 1938 |

OTHER REFERENCES

Renshaw, "J. Am. Chem. Soc.," vol. 32 (1910), pages 128 to 130.

Beilstein, "Organishche Chemie," vol. III–IV, Second Supplement (1942), page 721.